US011434012B2

(12) United States Patent
Benjamin et al.

(10) Patent No.: US 11,434,012 B2
(45) Date of Patent: Sep. 6, 2022

(54) VARIABLE THRUST CATAPULT

(71) Applicant: AMI Industries, Inc., Colorado Springs, CO (US)

(72) Inventors: Jeff Benjamin, Colorado Springs, CO (US); Matthew D Salois, Vacaville, CA (US)

(73) Assignee: AMI Industries, Inc, Colorado Springs, CO (US)

( * ) Notice: Subject to any disclaimer, the term of this patent is extended or adjusted under 35 U.S.C. 154(b) by 438 days.

(21) Appl. No.: 16/680,313

(22) Filed: Nov. 11, 2019

(65) Prior Publication Data

US 2021/0139152 A1 May 13, 2021

(51) Int. Cl.
*B64D 25/10* (2006.01)
*G01G 19/52* (2006.01)
*G01G 19/414* (2006.01)
*G01G 19/44* (2006.01)
*B64D 41/00* (2006.01)

(52) U.S. Cl.
CPC ............. *B64D 25/10* (2013.01); *B64D 41/00* (2013.01); *G01G 19/4142* (2013.01); *G01G 19/44* (2013.01); *G01G 19/52* (2013.01)

(58) Field of Classification Search
CPC ........ B64G 1/641; B64G 1/002; B64G 1/645; B64G 2001/643
See application file for complete search history.

(56) References Cited

U.S. PATENT DOCUMENTS

| 2,954,947 | A | * | 10/1960 | Zabelka | B64D 25/10 244/141 |
|---|---|---|---|---|---|
| 2,971,729 | A | * | 2/1961 | Martin | B64D 25/10 244/141 |
| 3,424,409 | A | * | 1/1969 | Stanley | B64D 25/08 244/141 |
| 3,556,442 | A | * | 1/1971 | Arnekull | B64D 25/10 244/122 R |
| 4,673,147 | A | | 6/1987 | Solomonides | |
| 4,706,909 | A | * | 11/1987 | Cuevas | B64D 25/10 244/122 AE |
| 4,846,421 | A | * | 7/1989 | Trikha | B64D 25/10 244/141 |
| 4,911,382 | A | * | 3/1990 | Aronne | B64D 25/10 307/118 |
| 2021/0107420 | A1 | * | 4/2021 | Schaub | G01G 5/006 |

* cited by examiner

*Primary Examiner* — Brady W Frazier
*Assistant Examiner* — Shanna Danielle Glover
(74) *Attorney, Agent, or Firm* — Snell & Wilmer L.L.P.

(57) ABSTRACT

A rocket catapult assembly for an ejection seat may comprise a motor assembly including a proximal end and a distal end, a first cartridge, and a second cartridge. The first cartridge and the second cartridge may be configured to provide a variable thrust based on an occupant's weight. The first cartridge may provide a thrust corresponding to a relatively light weight occupant, the second cartridge may provide a thrust corresponding to a relatively average weight occupant, and the first cartridge and second cartridge may provide a combined thrust corresponding to a relatively heavy weight occupant.

10 Claims, 8 Drawing Sheets

VARIABLE THRUST CATAPULT

FIELD

The present disclosure relates to escape systems, and more specifically, to variable thrust catapults for multi weight occupants.

BACKGROUND

Ejection systems are designed to expel pilots from an aircraft cockpit. Ejection seats in high performance aircraft benefit from safely removing the pilot or other occupant from the disabled aircraft across a wide variety of aircraft speed regimes, altitudes and aircraft attitudes. Occupants of aircrafts may be various weights ranging from a relatively light weight individual to a relatively heavy individual, which may prevent a single amount of force of thrust to propel an occupant out an aircraft from being desirable.

SUMMARY

A rocket catapult assembly for use in an ejection seat system of an aircraft is disclosed herein. The rocket catapult assembly may comprise: a motor assembly comprising a motor outer casing and a motor inner casing extending from a proximal end to a distal end, the motor inner casing defining a chamber; a first cartridge configured to provide a first thrust of the rocket catapult assembly, the first cartridge in fluid communication with the chamber; and a second cartridge configured to provide a second thrust of the rocket catapult assembly, the second cartridge in fluid communication with the chamber, the second thrust being greater than the first thrust.

In various embodiments, the rocket catapult assembly may further comprise a breach disposed at the distal end of the motor assembly, wherein the first cartridge and the second cartridge are housed in the breach. The breach may comprise a first manifold and a second manifold. The first cartridge may be disposed in the first manifold, and the second cartridge may be disposed in the second manifold. The rocket catapult assembly may further comprise a first ignitor and a second ignitor, wherein the first ignitor is in communication with the first cartridge and the second ignitor is in communication with the second cartridge. The first cartridge and the second cartridge may be disposed in the chamber. The rocket catapult assembly may further comprise a first manifold and a second manifold, wherein the first manifold and the second manifold are disposed in the chamber, and wherein the first cartridge is disposed in the first manifold and the second cartridge is disposed in the second manifold.

An aircraft ejection seat system is disclosed herein. The aircraft ejection seat system may comprise: a seat pan; a seat back coupled to the seat pan; and a rocket catapult assembly coupled to the seat back, the rocket catapult assembly comprising: a motor assembly comprising a motor outer casing and a motor inner casing extending from a proximal end to a distal end, the motor inner casing defining a chamber; a first cartridge configured to provide a first thrust of the rocket catapult assembly, the first cartridge in fluid communication with the chamber; and a second cartridge configured to provide a second thrust of the rocket catapult assembly, the second cartridge in fluid communication with the chamber, the second thrust being greater than the first thrust.

In various embodiments, the aircraft ejection seat system may further comprise a first ignitor in communication with the first cartridge and a second ignitor in communication with the second cartridge. The aircraft ejection seat system may further comprise a display switch configured to be in a first position, a second position, or a third position, wherein the display switch is configured to create a first electrical or energetic connection and enable the first ignitor in response to being in the first position, wherein the display switch is configured to create a second electrical connection and enable the second ignitor in response to being in the second position, and wherein the display switch is configured to create the first electrical connection and the second electrical connection in response to being in the third position. The aircraft ejection seat system may further comprise a load cell coupled to the seat pan. The aircraft ejection seat system may further comprise a controller in electrical communication with the load cell, the first ignitor, and the second ignitor. The controller may be configured to enable the first ignitor only when a weight below a first threshold weight is measured by the load cell. The controller may be configured to enable the first ignitor and the second ignitor when the weight is measured by the load cell as being above a second threshold weight, wherein the second threshold weight is greater than the first threshold weight. The controller may be configured to enable the second ignitor only when the weight measured by the load cell is between the first threshold weight and the second threshold weight. The aircraft ejection seat system may further comprise a breach, a first manifold, and a second manifold, wherein the first manifold and the second manifold are disposed in the breach, and wherein the first cartridge is disposed in the first manifold and the second cartridge is disposed in the second manifold.

A method of controlling an operating pressure of a rocket catapult assembly for an ejection seat of an aircraft is disclosed herein. The method may comprise: compressing a load cell disposed in a seat pan of the ejection seat; and enabling or disabling a first ignitor in response to compressing the load cell, wherein the first ignitor is coupled to, and in communication with, a first cartridge of the rocket catapult assembly, the first cartridge configured to provide a first thrust of the rocket catapult assembly; enabling or disabling a second ignitor in response to compressing the load cell, wherein the second ignitor is coupled to, and in communication with, a second cartridge of the rocket catapult assembly, the second cartridge configured to provide a second thrust of the rocket catapult assembly, the second thrust greater than the first thrust.

In various embodiments, the first ignitor may be enabled when the load cell measures a weight below a first threshold weight and when the load cell measures the weight above a second threshold weight, wherein the second threshold weight is greater than the first threshold weight. The second ignitor may be enabled when the load cell measures the weight being between the first threshold weight and the second threshold weight, and wherein the second ignitor is enabled when the load cell measures the weight being greater than the second threshold weight. The method may further comprise comparing a measured weight by the load cell to a first threshold weight and a second threshold weight.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

A variable thrust rocket catapult assembly for use in an aircraft ejection system is disclosed herein. The variable thrust catapult assembly comprises at least a first cartridge and a second cartridge. The first cartridge is configured to provide a first thrust to rocket catapult assembly and second cartridge is configured to provide a second thrust to rocket catapult assembly. The first thrust is less than the second thrust. The combined first cartridge and the second cartridge are configured to provide a maximum thrust to rocket catapult assembly. The maximum thrust to catapult assembly may correspond to a maximum weight occupant of the aircraft ejection system. The aircraft ejection system may use manually selection of which cartridges to use (i.e., a switch selecting an occupant's weight), or the aircraft ejection system may automatically select which cartridges to use (i.e., a sensor in communication with ignitors for the cartridges).

Figure 1A:
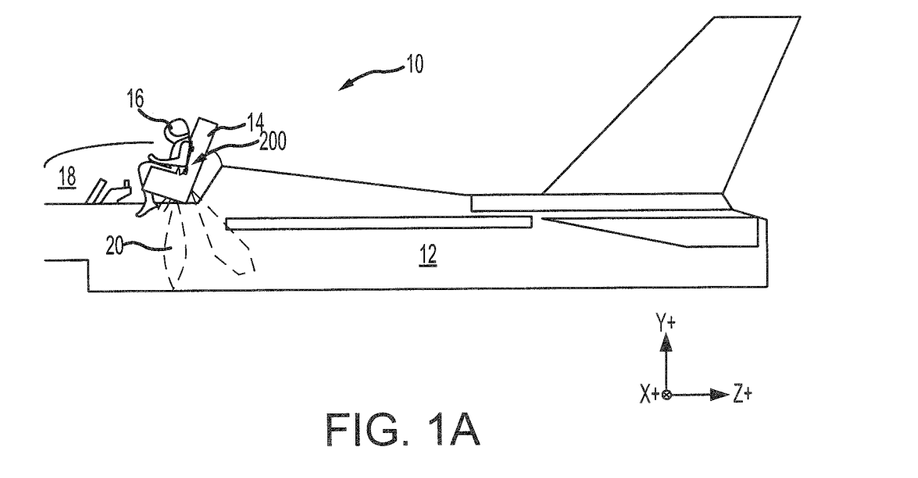
FIG. 1A illustrates an aircraft ejection system, in accordance with various embodiments.

With reference to FIG. 1A, an aircraft ejection system 10 is shown, in accordance with various embodiments. Aircraft ejection system 10 may be installed in aircraft 12 to expel an ejection seat 14 and an occupant 16 of ejection seat 14 from a cockpit 18 of aircraft 12. Ejection seat 14 may be urged from cockpit 18 by a propulsion system 20. In accordance with various embodiments, ejection seat 14 includes rocket catapult assembly 200. Rocket catapult assembly 200 may comprise an element of propulsion system 20 and be configured to extract the ejection seat 14 from cockpit 18.

Figure 1B:
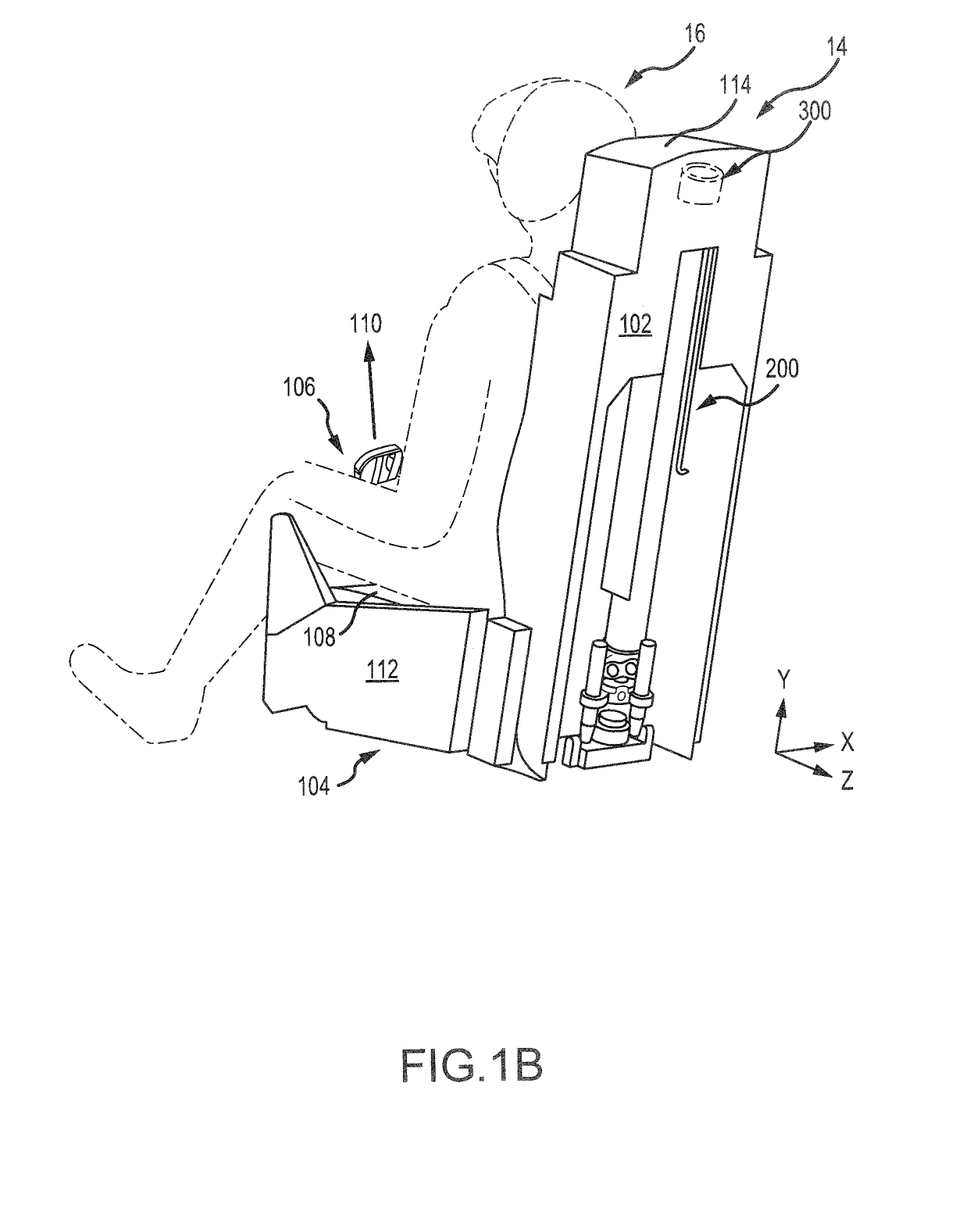
FIG. 1B illustrates an ejection seat having a catapult system in an inactive state, in accordance with various embodiments.

With additional reference to FIG. 1B, ejection seat 14 is illustrated with rocket catapult assembly 200 in an inactive state, in accordance with various embodiments. Ejection seat 14 includes a seat back 102 and a seat pan 104. The rocket catapult assembly 200 is coupled to seat back 102. In various embodiments, an ejection handle 106 may be located proximate a front 108 of seat pan 104. Front 108 of seat pan 104 is generally opposite, or distal, seat back 102. While FIG. 1B shows ejection handle 106 located at front 108 of seat pan 104, it is further contemplated and understood that ejection handle 106 may be located anywhere that is accessible to an occupant of ejection seat 14. For example, ejection handle 106 may be located on a side 112 of seat pan 104 or a headrest 114 of seat back 102.

Figure 2:
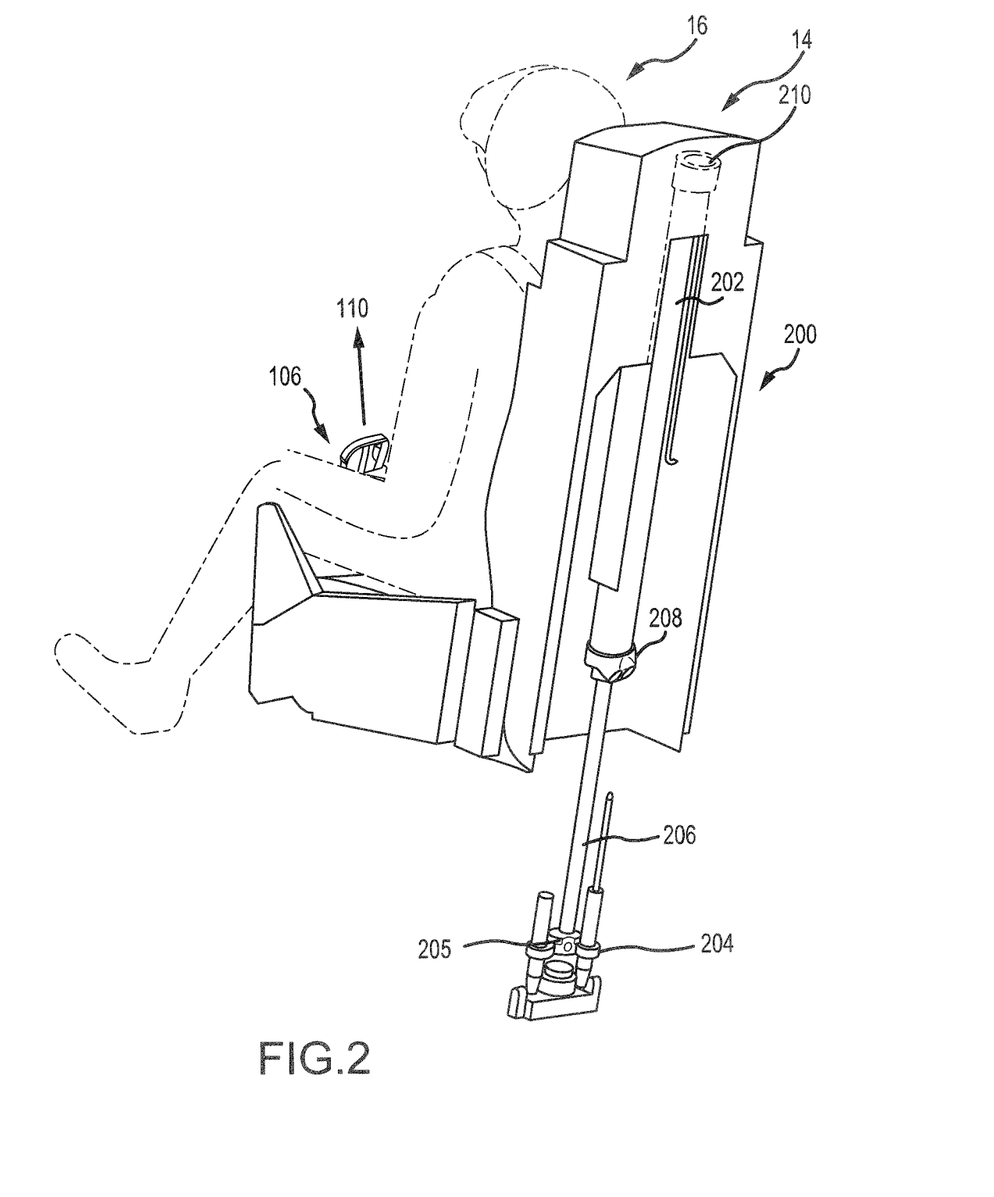
FIG. 2 illustrates an ejection seat having a catapult system in an active state, in accordance with various embodiments.

With additional reference to FIG. 2, ejection seat 14 is illustrated with rocket catapult assembly 200 in an active state, in accordance with various embodiments. Ejection handle 106 may be configured to initiate an ejection sequence upon actuation. For example, occupant 16 pulling ejection handle 106 in the direction of arrow 110 may activate the rocket catapult assembly 200. Rocket catapult assembly 200 may comprise a motor assembly 202, a breach 204, a catapult cartridge unit 205, a nozzle assembly 208, and a motor cap assembly 210. In response to activation, the catapult cartridge unit 205 may ignite and tend to produce relatively hot, high pressure, gas. Breach 204 may be coupled to the aircraft 12 and comprise a motor tube 206 disposed within the motor assembly 202. In various embodiments, motor cap assembly 210 may direct a first portion of gas to the breach 204 tending thereby to drive the motor tube 206 outward of the motor assembly 202 and cause ejection seat 14 to be expelled from cockpit 18. In various embodiments, motor tube 206 may separate from the motor assembly 202 in response to ejection seat 14 departing from the cockpit 18. In various embodiments, the breach 204 may include an integral gas generator which, in response to activation, may drive the motor tube 206 outward of the motor assembly 202 and cause ejection seat 14 to be expelled from cockpit 18. In various embodiments, the motor assembly 202 may be ignited in response to motor tube 206 exiting the motor assembly 202.

Figure 3:
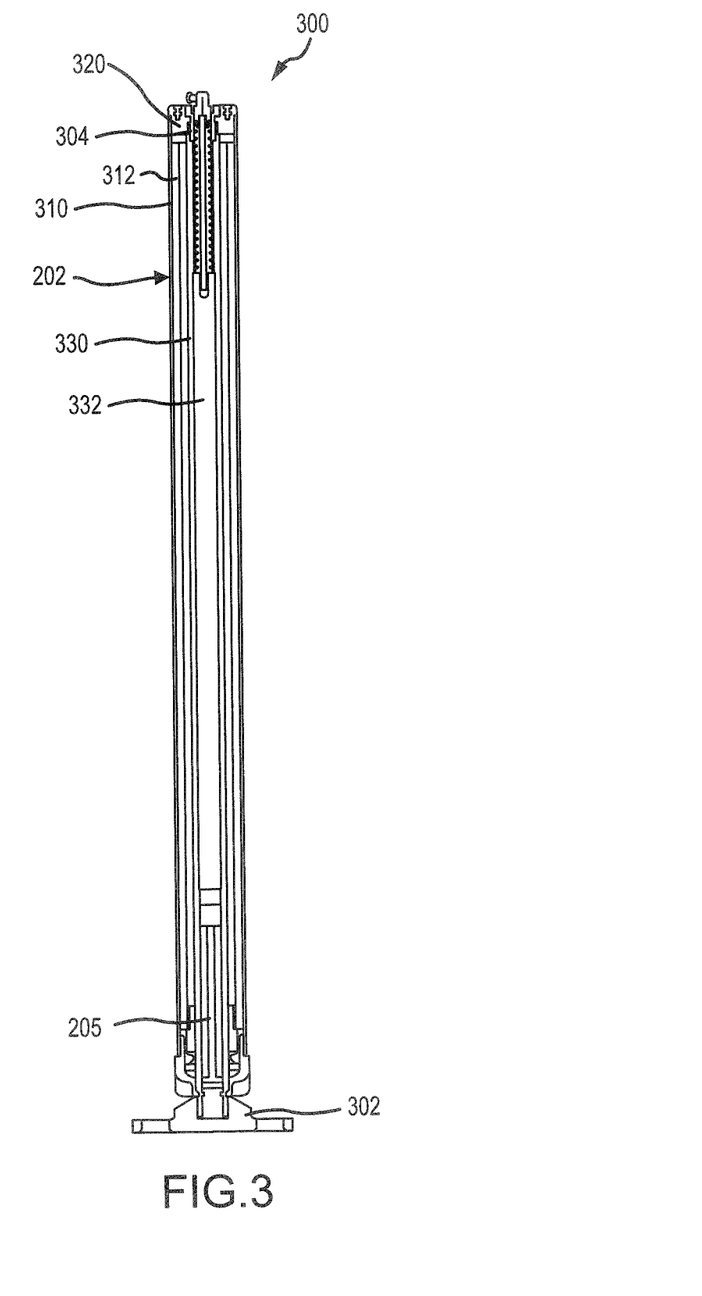
FIG. 3 illustrates a cross-sectional portion of a rocket catapult assembly, in accordance with various embodiments.

Referring now to FIG. 3, a cross-section of a portion of a rocket catapult assembly 300 in an inactive state, in accordance with various embodiments, is illustrated. The rocket catapult assembly 300 may comprise a proximal end 302 and a distal end 304 disposed opposite the proximal end 302. The proximal end 302 may be configured to be coupled to an aircraft (e.g., aircraft 12 from FIG. 1A). The distal end 304 may be configured to be coupled to an ejection seat (e.g., ejection seat 14 from FIG. 1A). The rocket catapult assembly 300 may further comprise a motor outer case 310 extending from proximal end 302 to distal end 304, a head cap 320 coupled to the motor outer case 310 at distal end 304, and a motor inner case 330 disposed radially inward from motor outer case 310. The head cap 320 may be coupled to the motor outer case 310 by any method known in the art, such as a lock ring, or the like. In various embodiments, the motor inner case 330 defines a chamber 332. The chamber 332 may be in fluid communication with a motor cap assembly (e.g., motor cap assembly 210 in FIG. 2).

Figure 4:
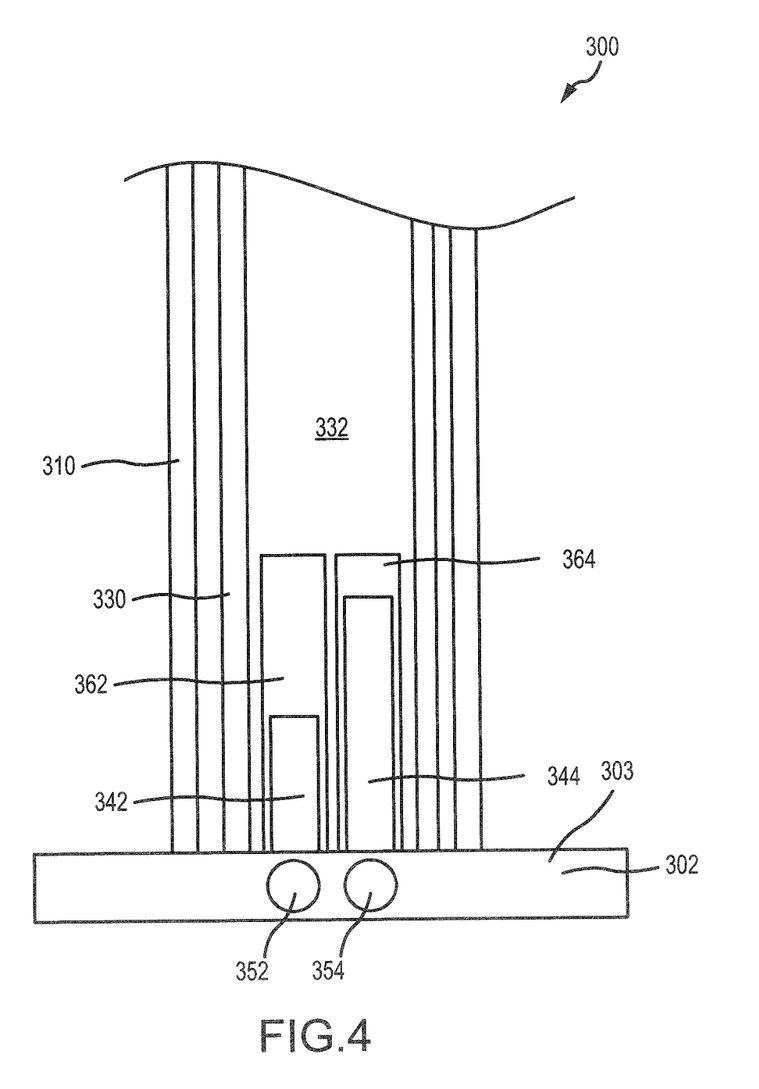
FIG. 4 illustrates a schematic of a portion of a rocket catapult assembly, in accordance with various embodiments.

Referring now to FIG. 4, a schematic view of a portion of a rocket catapult assembly 300, in accordance with various embodiments, is illustrated. In various embodiments, a rocket catapult assembly 300 may further comprise, a first cartridge 342, a second cartridge 344, a first ignitor 352 and a second ignitor 354. In various embodiments, the first ignitor 352 and the second ignitor 354 may be any ignitor known in the art, such as a pyrotechnic ignitor, a low current igniter, or the like. The first ignitor 352 may be configured to ignite first cartridge 342 and the second ignitor 354 may be configured to ignite second cartridge 344. In various embodiments, whether first ignitor 352, second ignitor 354, or both first ignitor 352 and second ignitor 354 are ignited is based on an occupant weight in an aircraft. For example, for a relatively lightweight occupant, only first ignitor 352 may be ignited. For a relatively average weight occupant, only second ignitor 354 may be ignited. For a relatively heavy occupant both first ignitor 352 and second ignitor 354 may be ignited.

In various embodiments, first cartridge 342 may be sized to provide a first thrust in proportion to a lightweight occupant, second cartridge 344 may be sized to provide a second thrust in proportion to a medium weight occupant, and the combination of first cartridge 342 and second cartridge 344 may be sized to provide a third thrust in proportion to a heavy weight occupant. In various embodiments, the first thrust is less than the second thrust and the second thrust is less than the third thrust.

In various embodiments, rocket catapult assembly 300 further comprises a first manifold 362 and a second manifold 364. The first manifold 362 may house first cartridge 342 and the second manifold 364 may house second cartridge 344. In various embodiments, the first manifold 362 and the second manifold 364 may keep the first cartridge 342 and the second cartridge 344 distinct and separate as to prevent both from igniting when only a single cartridge is ignited. In various embodiments, first manifold 362 and second manifold 364 are disposed in chamber 332. In various embodiments, proximal end 302 comprises a breach 303. In various embodiments, the breach 303 is configured to be coupled to a floor of an aircraft.

Figure 5:
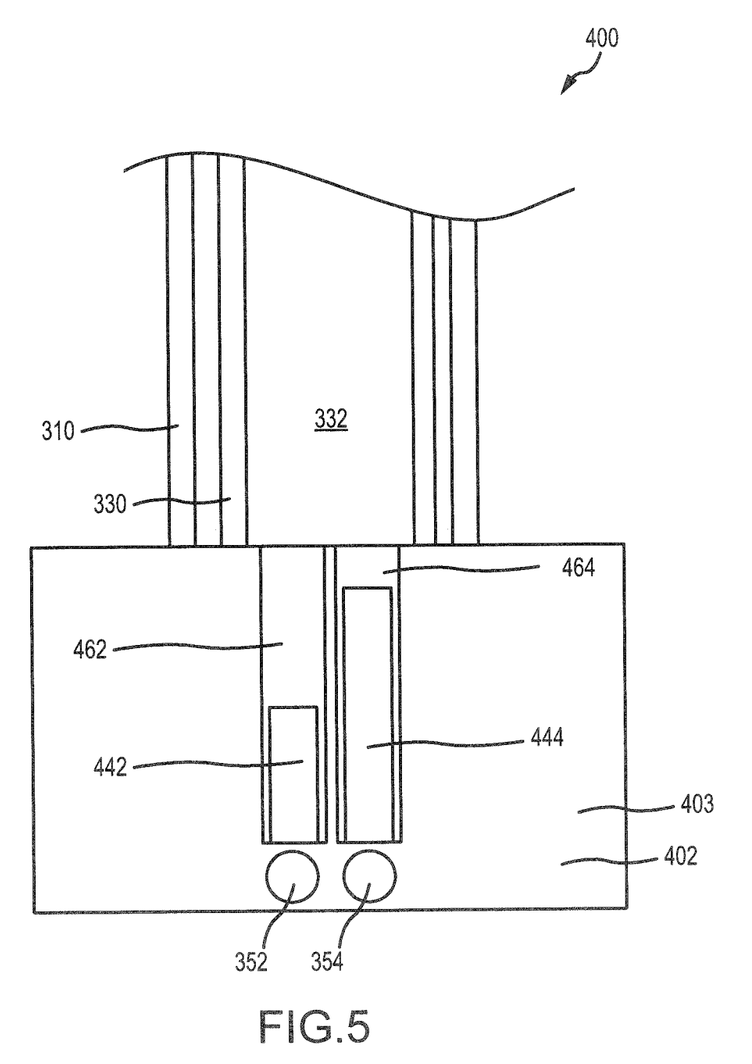
FIG. 5 illustrates a schematic of a portion of a rocket catapult assembly, in accordance with various embodiments.

In various embodiments, with brief reference to FIG. 5, a rocket catapult assembly 400 may comprise a proximal end configured to house manifolds. For example, rocket catapult assembly 400 comprises a proximal end 402 including a first manifold 462 and a second manifold 464. In various embodiments a breach 403 of rocket catapult assembly 400 houses a first cartridge 442 in first manifold 462 and houses a second cartridge 444 in a second manifold 464. The first manifold 462 and the second manifold 464 are in fluid communication with chamber 332 of rocket catapult assembly 400.

Figure 6:
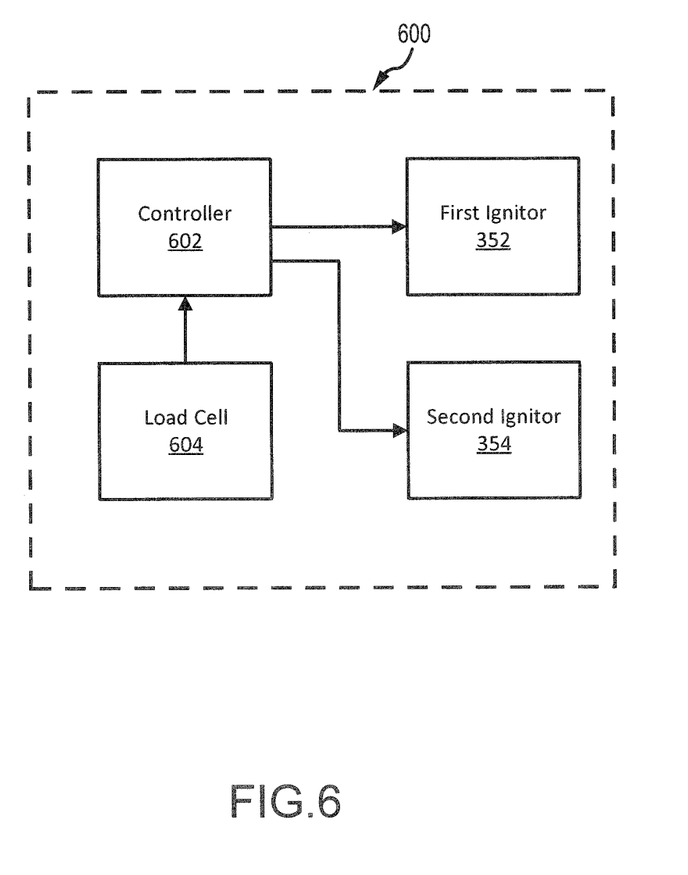
FIG. 6 illustrates a control system for a cartridge selection in a rocket catapult assembly, in accordance with various embodiments.

In various embodiments and with additional reference to FIG. 6, a schematic block diagram of a control system 600 for first ignitor 352 and second ignitor 354 is illustrated. Control system 600 includes a controller 602 in electronic communication with a load cell 604, the first ignitor 352 and the second ignitor 354. In various embodiments, controller 602 may be integrated into computer systems onboard aircraft 12 and/or ejection seat 14. In various embodiments, controller 602 may be configured as a central network element or hub to access various systems, engines, and components of control system 600. Controller 602 may comprise a network, computer-based system, and/or software components configured to provide an access point to various systems, engines, and components of control system 600. In various embodiments, controller 602 may comprise a processor. In various embodiments, controller 602 may be implemented in a single processor. In various embodiments, controller 602 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 602 may comprise a processor configured to implement various logical operations in response to execution of instructions, for example, instructions stored on a non-transitory, tangible, computer-readable medium configured to communicate with controller 602.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, controller 602 may be in electronic communication with load cell 604. Load cell 604 may be disposed in seat pan 104. Load cell 604 may comprise any load cell known in the art, such as a compression load cell, or the like. Load cell 604 may be configured to measure a weight of an occupant 16. Load cell 604 may be configured to transmit measurements to controller 602, thereby providing the measured weight of the occupant 16 to controller 602.

In various embodiments, controller 602 may receive an ejection command from the ejection handle 106. In response to the ejection command, the controller 602 may command the rocket catapult assembly 200 to transition from the inactive state to the active state. In response, the motor assembly 202 may ignite the first cartridge 342, the second cartridge 344, or both the first cartridge 342 and the second cartridge 344. In various embodiments, when the load cell 604 measures a weight of an occupant that is less than a first threshold weight, the controller may enable only the first ignitor 352. In various embodiments, when the load cell 604 measures a weight of an occupant that is greater than a second threshold weight, the controller may enable both the first ignitor 352 and the second ignitor 354. When the load cell 604 measures a weight of an occupant that is between the first threshold weight and the second threshold weight, the controller may enable only the second ignitor. In various embodiments, the first ignitor 352 is in communication with the first cartridge 342 and the second ignitor 354 is in communication with the second cartridge 344. The first cartridge 342 is configured to generate a thrust of rocket catapult assembly 200 that is less than a thrust generated by the second cartridge 344.

In this regard and by controlling which cartridges in the rocket catapult assembly 300 as a function of an occupant weight, an occupant 16 of an aircraft 12 may be ejected at a force based on the weight of the occupant 16, as opposed to a maximum weight of an occupant.

Figure 7:
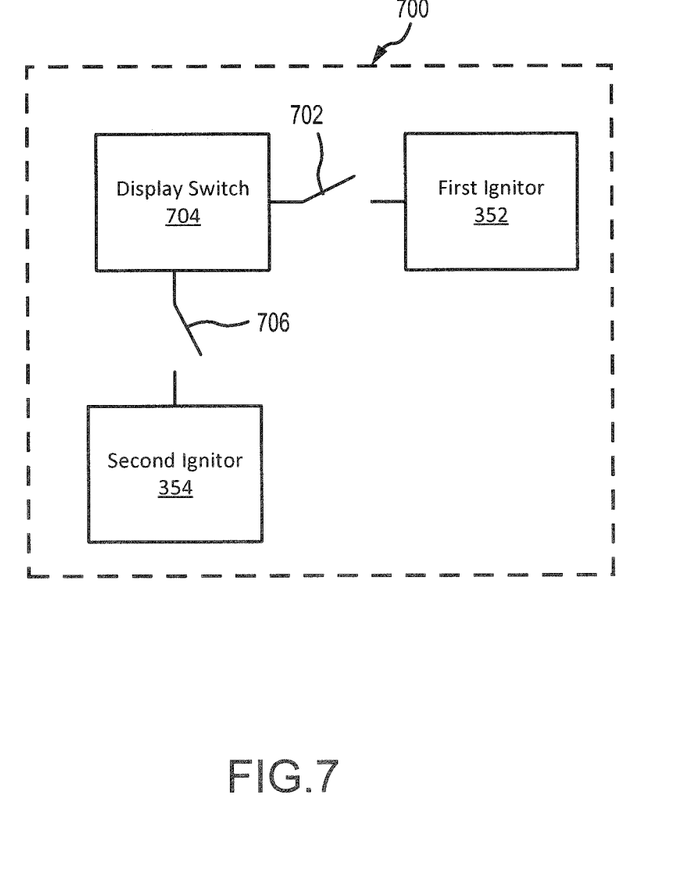
FIG. 7 illustrates a control system for a cartridge selection in a rocket catapult assembly, in accordance with various embodiments.

With reference now to FIG. 7, a schematic block diagram of a control system 700 for first ignitor 352 and second ignitor 354 is illustrated. In various embodiments, control system 700 comprises a display switch 704, first ignitor 352, and second ignitor 354. The display switch 704 may be disposed in a cockpit of aircraft 12 and electrically or energetically coupled to the first ignitor 352 via a first electrical switch 702 and electrically coupled to the second ignitor 354 via a second electrical switch 706. Display switch 704 may comprise three positions (e.g., an off position, a neutral position, and an on position, or the like). In various embodiments, the first electrical switch 702 may be configured to enable first ignitor 352 when display switch 704 is in a first position or a third position. In various embodiments, the second electrical switch 706 may be configured to enable the second ignitor 354 when display switch 704 is in a second position or the third position. As such, "first position" may correspond to a relatively light weight person, "second position" may correspond to a relatively average weight occupant, and "third position" may correspond to a relatively heavy weight occupant. Display switch 704 may be manually turned to first position, second position, or third position (i.e., the occupant 16 manually selects a display switch position based on occupant's weight, which completes the first circuit, the second circuit or both circuits in response).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A rocket catapult assembly for use in an ejection seat system of an aircraft, comprising:
    a motor assembly comprising a motor outer casing and a motor inner casing extending from a proximal end to a distal end, the motor inner casing defining a chamber;
    a first cartridge configured to provide a first thrust of the rocket catapult assembly, the first cartridge in fluid communication with the chamber;
    a second cartridge configured to provide a second thrust of the rocket catapult assembly, the second cartridge in fluid communication with the chamber, the second thrust being greater than the first thrust; and
    a breach, a first manifold and a second manifold, wherein the first manifold and the second manifold are disposed in the breach, and wherein the first cartridge is disposed in the first manifold and the second cartridge is disposed in the second manifold.

2. The rocket catapult assembly of claim 1, further comprising a first ignitor and a second ignitor, wherein the first ignitor is in communication with the first cartridge and the second ignitor is in communication with the second cartridge.

3. An aircraft ejection seat system comprising:
    a seat pan;
    a seat back coupled to the seat pan; and
    a rocket catapult assembly coupled to the seat back, the rocket catapult assembly comprising:
        a motor assembly comprising a motor outer casing and a motor inner casing extending from a proximal end to a distal end, the motor inner casing defining a chamber;

a first cartridge configured to provide a first thrust of the rocket catapult assembly, the first cartridge in fluid communication with the chamber; and a second cartridge configured to provide a second thrust of the rocket catapult assembly, the second cartridge in fluid communication with the chamber, the second thrust being greater than the first thrust; and a breach, a first manifold, and a second manifold, wherein the first manifold and the second manifold are disposed in the breach, and wherein the first cartridge is disposed in the first manifold and the second cartridge is disposed in the second manifold.

4. The aircraft ejection seat system of claim 3, further comprising a first ignitor in communication with the first cartridge and a second ignitor in communication with the second cartridge.

5. The aircraft ejection seat system of claim 4, further comprising a load cell coupled to the seat pan.

6. The aircraft ejection seat system of claim 5, further comprising a controller in electrical communication with the load cell, the first ignitor, and the second ignitor.

7. The aircraft ejection seat system of claim 6, wherein the controller is configured to enable the first ignitor only when a weight below a first threshold weight is measured by the load cell.

8. The aircraft ejection seat system of claim 7, wherein the controller is configured to enable the first ignitor and the second ignitor when the weight is measured by the load cell as being above a second threshold weight, wherein the second threshold weight is greater than the first threshold weight.

9. The aircraft ejection seat system of claim 8, wherein the controller is configured to enable the second ignitor only when the weight measured by the load cell is between the first threshold weight and the second threshold weight.

10. An aircraft ejection seat system comprising:

a seat pan;

a seat back coupled to the seat pan;

a display switch configured to be in a first position, a second position, or a third position; and a rocket catapult assembly coupled to the seat back, the rocket catapult assembly comprising:

a motor assembly comprising a motor outer casing and a motor inner casing extending from a proximal end to a distal end, the motor inner casing defining a chamber;

a first cartridge configured to provide a first thrust of the rocket catapult assembly, the first cartridge in fluid communication with the chamber;

a second cartridge configured to provide a second thrust of the rocket catapult assembly, the second cartridge in fluid communication with the chamber, the second thrust being greater than the first thrust;

a first ignitor in communication with the first cartridge; and a second ignitor in communication with the second cartridge, wherein:

the display switch is configured to create a first electrical connection and enable the first ignitor in response to being in the first position, the display switch is configured to create a second electrical connection and enable the second ignitor in response to being in the second position, and the display switch is configured to create the first electrical connection and the second electrical connection in response to being in the third position.

* * * * *